United States Patent
Feierbach et al.

[19]

[11] Patent Number: 6,088,786
[45] Date of Patent: Jul. 11, 2000

[54] METHOD AND SYSTEM FOR COUPLING A STACK BASED PROCESSOR TO REGISTER BASED FUNCTIONAL UNIT

[75] Inventors: Gary Feierbach, Belmont; Mukesh Patel, Fremont, both of Calif.

[73] Assignee: Sun Microsystems, Inc., Palo Alto, Calif.

[21] Appl. No.: 08/884,255

[22] Filed: Jun. 27, 1997

[51] Int. Cl.[7] .................................................. G06F 15/00
[52] U.S. Cl. ........................... 712/200; 712/202; 712/203
[58] Field of Search ..................... 395/800.42, 800.34, 395/800.35; 712/200, 201, 202, 203, 204

[56] References Cited

U.S. PATENT DOCUMENTS

| | | | |
|---|---|---|---|
| 5,481,693 | 1/1996 | Blomgren et al. | 395/566 |
| 5,542,059 | 7/1996 | Blomgren | 395/800.41 |
| 5,592,679 | 1/1997 | Yung | 395/800.23 |
| 5,685,009 | 11/1997 | Blomgren et al. | 395/800.23 |
| 5,696,955 | 12/1997 | Goddard et al. | 712/222 |
| 5,805,486 | 9/1998 | Sharangpani | 364/736.04 |
| 5,835,748 | 11/1998 | Orenstein et al. | 712/217 |
| 5,848,423 | 12/1999 | Ebrahim et al. | 707/206 |
| 5,857,096 | 1/1999 | Birstry et al. | 712/229 |

*Primary Examiner*—Meng-Ai T. An
*Assistant Examiner*—Mackly Monestime
*Attorney, Agent, or Firm*—Sierra Patent Group

[57] ABSTRACT

A microprocessor capable of performing multimedia and non-multimedia operations provided a plurality of stack based instructions is provided. The microprocessor includes a stack processor coupled to a stack capable of storing values, a register processor coupled to a register file capable of storing values, and a copy-unit having a first port coupled to the stack and a second port coupled to the register file being configured to copy data between the register file and the stack. The microprocessor also includes logic coupled to receive the plurality of stack based instructions from memory, cache, or other storage devices coupled to the microprocessor. The logic is configured to determine which of the plurality of stack based instructions are regular stack instructions and which of the plurality of stack based instructions are extended stack instructions. A stack decoder having a first port coupled to the logic and a second port coupled to the stack processor is configured to decode the regular stack instructions and provide control signals to the stack processor. A copy-unit decoder having a first port coupled to the logic and a second port coupled to the copy-unit is configured to decode extended stack instructions and provide control signals to the copy-unit. Further, a register processor decoder having a first port coupled to the logic and a second port coupled to the register processor is configured to decode extended stack instructions and provide the decoded extended stack instructions to the register processor.

10 Claims, 6 Drawing Sheets

# METHOD AND SYSTEM FOR COUPLING A STACK BASED PROCESSOR TO REGISTER BASED FUNCTIONAL UNIT

RELATED APPLICATIONS

This application is related to U.S. application Ser. No. 8/X filed XX, 1997, entitled "A MODULAR COPROCESSOR UNIT WITH INTEGRATED MULTIMEDIA FUNCTIONS" and naming Bruce Petrick as inventor, and U.S. application Ser. No. 8/X filed XX, 1997, entitled "A PROCESSOR COMPLEX FOR EXECUTING MULTIMEDIA FUNCTIONS" and naming Bruce Petrick and Mukesh Patel as inventors, both of which are assigned to the assignee of the present invention and are herein incorporated, in their entirety, by reference.

FIELD OF THE INVENTION

The present invention relates generally to computer architecture and, more specifically, to a method and apparatus for coupling a stack based processor to a register based functional unit.

BACKGROUND OF THE INVENTION

An increasing number of devices used in business and domestically are controlled by small embedded microprocessors. Generally, these embedded processors are low-cost and include a limited amount of memory or storage for executing applications. Consequently, the applications executed on these embedded processors must also be relatively small and compact.

It is also desirable that these small applications also be interoperable with a large class of devices, such as cellular phones, manufactured by different companies. This reduces the costs associated with developing software applications and therefore decreases the overall cost of ownership for the device. For example, cellular phone users should be able to transfer applications to each other and download them into their phone for processing. This would greatly enhance the flexibility and feature set on cellular phones even though the phones may be different models designed by different manufacturers.

A general purpose stack based processor fits these requirements well because stack instructions tend to be small and compact. The general purpose stack based processor includes a stack for storing operands and a stack processor which processes instructions by popping one or more operands off the stack, operating on them, and then pushing the results back on the stack for another instruction to process. Essentially, stack based executables are compact because the stack instructions reference operands implicitly on the stack rather than explicitly in the instructions. The storage space saved by not referencing operands such as registers, memory addresses, or immediate values explicitly can be used to store additional stack instructions.

Embedding a general purpose stack based processor in a wide variety of devices is also very cost effective. Compared with RISC (reduced instruction set computer) or CISC (complex instruction set computer) processors, stack processor research and development costs are relatively low. Stack processors are well understood and relatively simple to design. Another part of the cost effectiveness is based on developing software that can be shared and used by a wide variety of different devices. By increasing software interoperability between devices, stack based processors can be produced in high volumes, low profit margins, and yet have high overall profits. For example, software applications consisting of architecturally neutral bytecode instructions can be readily shared when designed for execution on a Java Virtual Machine (JVM) stack based processor such as described in the book, "The Java Virtual Machine Specification" by Tim Lindholm and Frank Yellin, published by Addison-Wesley, 1997. These bytecode instruction based software applications are compact and substantially interoperable with almost any device utilizing, or simulating, a JVM stack based processor.

Unfortunately, general purpose stack based processors are generally not well suited for high-performance multimedia or other real time processing. In part, performance is often impacted on a stack based processor manipulating the stack to gain access to the operands. Generally, numerous machine cycles are spent pushing and popping operands on the stack. For example, graphic processing on a stack based processor is difficult because the instruction can not manipulate groups of pixels or data points as needed when performing various digital signal processing based compression/decompression techniques such as MPEG video or digital Dolby/AC-3 based audio. Consequently, processing groups of pixels on a stack based processor requires numerous stack operations and is inefficient. Potentially, each pixel value would have to be pushed on the stack and operated on. Each calculation would be a separate operation and it would be difficult to take advantage of redundant calculations that generally occur in image processing and audio processing. Clearly, additional processing required on a stack based processor would make it difficult to perform these calculations in a time frame acceptable for users expecting real-time multimedia effects.

Register based processors typically access operands quickly but require much wider instructions and thus larger executables. For example, 5 bits are required to address each register in a register based processor having 32 registers. A typical instruction addressing two source registers, which contain operand values, and a destination register, for storing the results, requires at least 15 bits just to address the necessary registers. This does not include the additional 8 bits required for the opcode and other portions of the instruction. Consequently, even the smallest software application executable on a register based processor may be too large to fit in the available memory or storage area associated with a particular device.

What is needed is a method and apparatus for coupling a stack based processor to a register based functional unit. The register based functional unit should be capable of performing real-time and graphics operations while the stack based processor is performing stack based instructions.

SUMMARY OF THE INVENTION

Embodiments of the present invention provide a microprocessor capable of executing stack based instructions and performing multimedia and non-multimedia operations. Unlike other microprocessors, this microprocessor combines the processing power associated with a stack based processor and a register based processor together such that the register based processor is a functional unit available to the stack based processor for co-processing. This combination takes advantage of real-time processing and graphics operations that a register based processor can provide as well as the compact nature of a stack based application program. Thus, one can utilize this microprocessor for high performance multimedia applications which have limited storage for storing an application.

In one embodiment, the microprocessor includes a stack processor coupled to a stack capable of storing values, a register processor coupled to a register file capable of storing values, and a copy-unit having a first port coupled to the stack and a second port coupled to the register file being configured to copy data between the register file and the stack. Provided the proper control signals and address information are present, the copy unit copies data between the register file and the stack. This is useful for sharing values generated a register based processor with the stack based processor and vice-versa.

In another embodiment, the microprocessor also includes logic useful in distributing the processing of instructions between the stack based processor and the register based processor. The logic is coupled to receive a plurality of stack based instructions from memory, cache, or other storage devices coupled to the microprocessor. The logic is configured to determine which of the plurality of stack based instructions are regular stack instructions (i.e. instructions that do not relate to multimedia operations) and which of the plurality of stack based instructions are extended stack instructions (i.e. instructions that do relate to multimedia operations). A stack decoder having a first port coupled to the logic and a second port coupled to the stack processor is configured to decode the regular stack instructions and provide control signals to the stack processor. A copy-unit decoder having a first port coupled to the logic and a second port coupled to the copy-unit is configured to decode extended stack instructions and provide the decoded extended stack instructions to the copy-unit. In addition, a register processor decoder having a first port coupled to the logic and a second port coupled to the register processor is configured to decode extended stack instructions and provide control signals to the register processor.

Embodiments of the present invention provide a novel architecture with several advantages. First, applications executed on a combination stack and register processor can perform high performance graphics operations using very compact and dense code. Stack based instructions can be used to operate both the stack processor as well as the register based processor. This keeps the width of the instructions narrow and the overall size of the application small. Thus, compact applications can process regular stack instructions on the stack based processor while taking advantage of graphics or real-time processing available on the register based processor.

Despite this novel architecture, embodiments of the present invention remain compatible with other conventional stack based processors. Combining the stack based processor with a separate register based processor improves multimedia performance while maintaining downward compatibility with conventional stack based processors. For example, assume a first cellular phone has a sophisticated display and uses a stack processor coupled to a register processor using one embodiment of the present invention. Video and graphics displayed on this sophisticated display are driven by the register based processor while other types of general processing is performed on the stack based processor. Next, assume a second cellular phone has a conventional display which is not capable of displaying multimedia type graphics or video and therefore only uses a conventional stack based processor for all processing requirements. Further, assume a software application is executed on both the first and second phone which includes regular stack instructions, executable on the stack based processor, and extended stack instructions executable with assistance from a register based processor coupled to the stack based processor in accordance with the present invention. Nonetheless, both the first and second cellular phone a share the same stack based applications since both phones include a compatible stack based processor. Specifically, to handle an extended stack instruction the second phone executes a trap mechanism which treats the extended instructions as a no-op (no operation) instruction and then advances the program counter for the software application accordingly.

Coupling a register based processor to a stack based processor also provides for an easier upgrade path for high performance processors. For example, a computer manufacturer can increase the performance of the register processor and attach it to the stack processor without redesigning the stack processor as well. Using the present invention, the computer manufacturer can upgrade the register processor and couple it to the original stack processor at a reduced research and development cost.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Overall Microprocessor Environment

A microprocessor designed in accordance with the present invention is capable executing stack based instructions and performing multimedia and non-multimedia operations. Typical multimedia operations include the digital signal processing operations associated with video compression/decompression, audio compression/decompression, and image processing.

Figure 1:
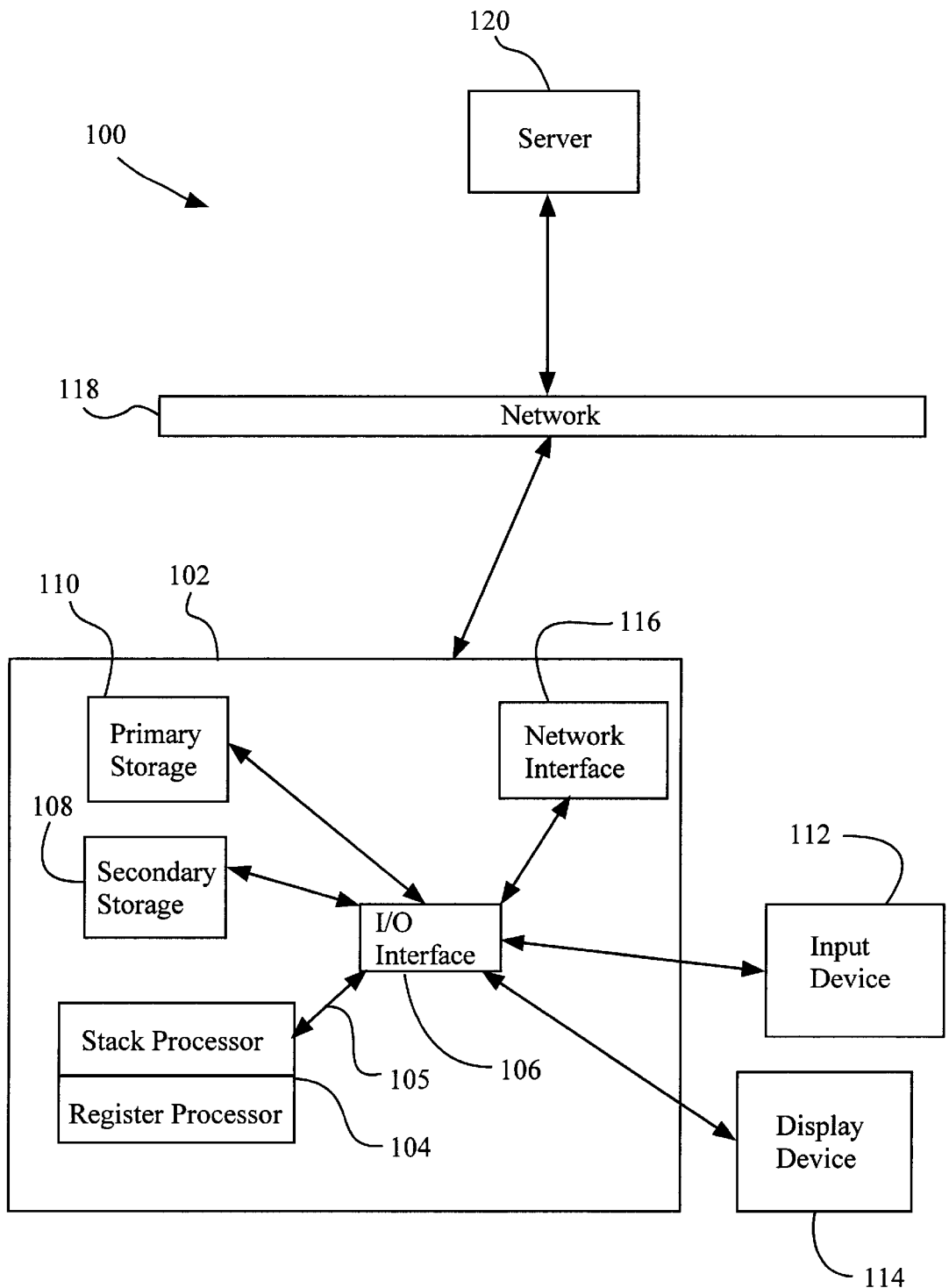
FIG. 1 is a block diagram illustrating one embodiment of a stack and register processor embedded in a client processing node coupled to a server processing node in a computer network.

One embodiment of the present invention couples together a stack based processor and a register based processor for improved stand-alone performance and interoperability compared with other microprocessor architectures. Accordingly, FIG. 1 illustrates one embodiment of the present invention embedded in a client processing node 102, also referred to as client 102, coupled to a server processing node 120, also referred to as server 120, over a computer network 118. Generally, client 102, server 120, and other nodes (not shown) coupled to network 118 transmit information utilizing the TCP/IP protocol. Other network protocols such as SNA, X.25, Novell Netware[1], Vines, or Apple Talk could also be used to provide similar client-server communication capabilities.

1. Netware is a registered trademark of Novell, Inc. in the United States and other countries.

Processors used in server 120 and client 102 are typically designed around a standard stack based processor for the greatest degree of interoperability. The stack based architecture used by embodiments of the present invention facilitates the ready exchange of data and stack instructions in a heterogeneous distributed programming environment. For example, a stack based processor can be designed according to the Java Virtual Machine (JVM) stack based processor such as described in the book, "The Java Virtual Machine Specification" by Tim Lindholm and Frank Yellin, published by Addison-Wesley, 1997 and capable of processing architecturally neutral bytecode instructions arranged in a predetermined format called a class file. A class file is a platform independent format which contains executable instructions. The class file format precisely defines the contents of such a file, including details such as byte ordering, which often is assumed in a platform specific file format. The bytecode instructions contained in these class files are typically generated by compiling applications written in the JAVA object-oriented programming language but could also be generated from other programming languages using the appropriate compiler with the JVM as a target platform. For example, an application written in C or C++ can be compiled into bytecodes provided the compiler is capable of generating bytecodes from a high-level programming language such as C and C++.

Referring to FIG. 1, client 102 includes a stack and register processor 104, an 1/0 (input-output) interface 106, a secondary storage 108, a primary storage 110, an input device 112, a display device 114, and a network interface 116 which facilitates communication between these aforementioned elements. As previously discussed, network interface 116 couples client 102 to network 118 and facilitates communication between client 102 and other processing nodes on network 118 which typically includes exchanging data and distributed processing of applications.

Stack and register processor 104 is typically embedded in devices which require some data processing yet are limited by the cost and space required for large amounts of memory. Typically, these devices includes consumer devices which can be controlled by a processor such as cellular phones, ovens, refrigerators, televisions, and portable devices, as well as industrial devices such as process control systems, automated manufacturing and warehousing devices, instrumentation devices, and other industrial devices with require some amount of pre-operational or post-operational data processing in addition to their operation.

Many, if not all, of the devices discussed above also have multimedia capabilities which require moderate to complex data processing. These capabilities include graphics or image processing for displaying images on a display device as well as sound generation and audio processing. Audio processing typically includes voice recognition for identification and speech recognition for understanding commands and words provided verbally. As will become apparent from the discussion below, stack and register processor 104 provides the processing power to improve the performance associated with these and other similar applications.

In operation, stack and register processor 104 on client 102 fetches stack instructions from primary storage 110 through I/O interface 106. After retrieving these instructions, stack and register processor 104 decodes the stack instructions and determines which are suitable for execution on a stack processor and which are suitable for execution on a register processor. In one embodiment, instructions involving multimedia, such as video, graphics and audio processing, are classified as extended stack instructions and are executed primarily on the register based processor. If an instruction does not concern multimedia type operations, the instruction is classified as a regular stack instruction and is executed on the stack processor in a conventional manner.

Embodiments of the present invention facilitate communication and transmission of data between the stack processor and register processor both located within stack and register processor 104. Values are copied from a stack associated with the stack processor and inserted into a register file associated with the register based processor as needed for executing extended stack instructions. In one embodiment of the present invention, the stack processor used in stack and register processor 104 is based on the PicoJava hardware architecture[1] designed by Sun Microsystems and detailed in U.S. patent application Ser. No. 08/xxx, xxx, filed Jan. 23, 1997, entitled "Hardware Virtual Machine Instruction Processor", authored by Marc Tremblay and Michael O'Connor, herein incorporated by reference in the entirety. The register processor used in stack and register processor 104 compatible with the Visual Instruction Set (VIS) also designed by Sun Microsystems and the subject of U.S. patent application Ser. No. 08/722,442, filed Oct. 10, 1996, entitled "Visual Instruction Set for CPU with Integrated Graphic Functions", authored by Robert Yung, herein incorporated by reference in the entirety. Those skilled in the art will understand that alternative embodiments of the present 1.JAVA, PicoJAVA, UltraJAVA, HotJAVA, The Network Is the Computer, Sun, the Sun logo, Sun Microsystems, Solaris, and Ultra are trademarks or registered trademarks of Sun Microsystems, Inc. in the United States and in other countries. All SPARC trademarks are used under license and are trademarks or registered trademarks of SPARC International, Inc. in the United States and other countries. Products bearing SPARC trademarks are based upon an architecture developed by Sun Microsystems, Inc. UNIX is a registered trademark in the United States and other countries exclusively licensed through X/Open Company, Ltd. invention can also be used to couple together processors such as the PowerPC processor available from Motorola of Schaumburg, Ill., or any of the Pentium or x86 compatible processors available from the Intel Corporation or other corporations such as AMD, and Cyrix with other stack based processors.

Executing the stack instructions enables the stack and register processor 104 to perform a wide variety of computing operations. Accordingly, stack and register processor 104 can retrieve data or write data to primary storage 110, secondary storage 108, display information on display device 114, receive input signals from input devices 112, or retrieve data or write data to other processing nodes coupled to network 118 such as server 120. Unlike the prior art purely stack based processors, the additional register based functional unit coupled together using one embodiment of the present invention achieves higher levels of real-time processing than were previously available.

Microprocessor Architecture

Figure 2:
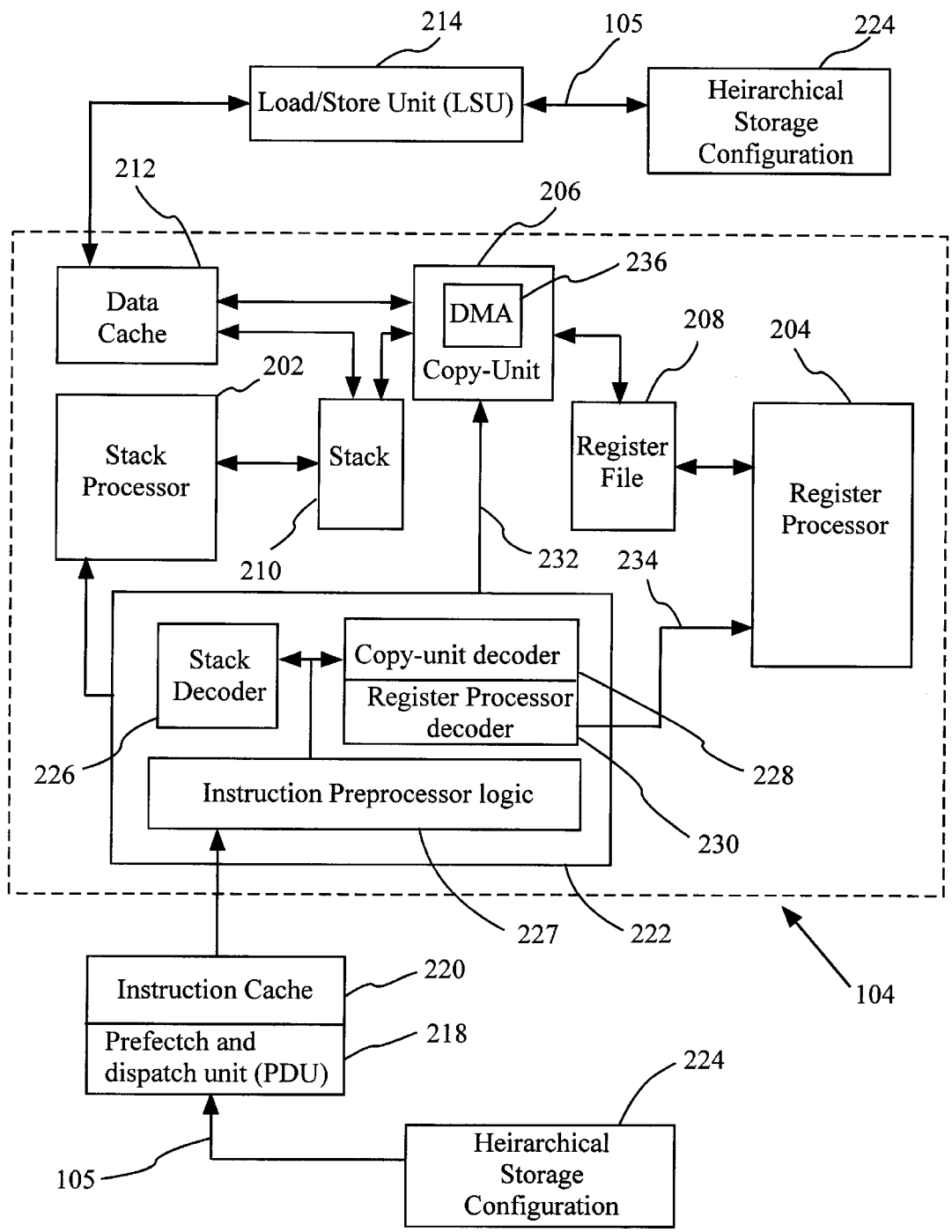
FIG. 2 is a block diagram illustrating the overall architecture of stack and register processor in accordance with the present invention.

Referring to FIG. 2, a block diagram illustrates the overall architecture of stack and register processor 104. Stack and register processor 104 includes a stack processor 202, a register processor 204, a copy-unit 206, a register file 208, a stack 210, a data cache 212, a load/store unit (LSU) 214, a prefetch and dispatch unit 218 coupled to an instruction cache 220, and an instruction decoder 222. Instruction decoder 222 also includes instruction preprocessor logic 227, a stack decoder 226 for processing a regular stack instruction and a copy-unit decoder 228 and register processor decoder 230 combination for processing an extended stack instruction. Details on each element within stack and register processor 104 are discussed in further detail below.

In FIG. 2, stack and register processor 104 receives data and instructions from a bus 105 which is typically coupled to a hierarchical storage configuration 224 of primary storage devices 110 (FIG. 1) such as RAM memory and secondary storage devices 108 such as magnetic disk. Instructions and data can be loaded from all levels of storage devices in hierarchical storage configuration 224 (FIG. 2) depending on the data and instructions provided in a given application.

For loading data, load/store unit 214 (LSU) coupled to bus 105 loads data over bus 105 from hierarchical storage configuration 224. Load/store unit 214 selectively stores data in data cache 212. For processing efficiency, data cache 212 is typically a direct mapped cache, however alternatively it can also be configured as a fully associative or set associative cache. Further, data can be written to data cache 212 using write through (or store through) or write back cache update techniques. Overall, the cache read and write techniques used in data cache 212 are selected to minimize data bottlenecks and optimize the processing throughput of stack and register processor 104.

For fetching instructions, bus 105 is also coupled to prefetch and dispatch unit (PDU) 218 which fetches instructions from hierarchical storage configuration 224 or instruction cache 220 and provides the instructions to instruction decoder 222. Prefetch and dispatch unit 218 includes logic which fetches instructions before they are actually needed so that execution units within stack and register processor 104 do not starve.

Instruction decoder 222 includes an instruction preprocessor logic 227 to detect whether the instruction type is a regular stack instruction, suitable for execution on stack processor 202, or an extended stack instruction, suitable for execution on register processor 204. Accordingly, stackdecoder 226, contained within instruction decoder 222, partially or fully decodes regular stack instructions and provides the results to stack processor 202 for execution. During decoding, stack decoder 226 extracts opcodes and operands from a regular stack instruction as required for execution on stack processor 202.

Figure 3:
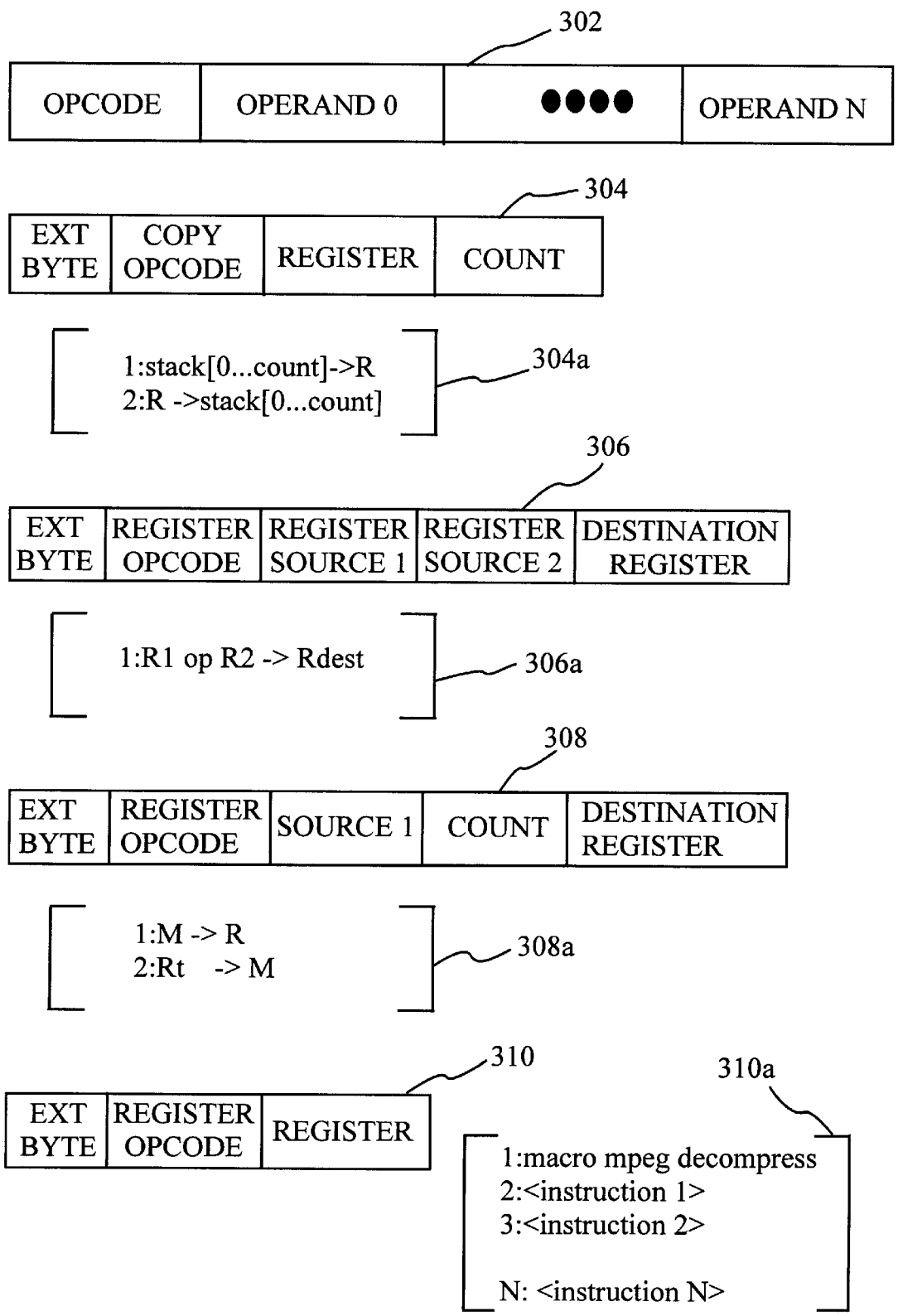
FIG. 3 is a block diagram illustrating the layout of a regular stack instruction and an extended stack instruction.

In one embodiment, a regular stack instruction 302, as illustrated in FIG. 3, includes an opcode, indicating the stack operation to be performed, followed by zero or more operands. For example, regular stack instruction 302 in FIG. 3 is an architecturally neutral bytecode instruction selected from the Java Virtual Machine (JVM) instruction set described in, "The Java Virtual Machine Specification", authored by Tim Lindholm and Frank Yellin, Addison-Wesley, 1997. Those skilled in the art will understand how to construct logic, in software or in hardware, capable of detecting regular or extended stack instructions having this format or a substantially similar format.

Returning to FIG. 2, stack 210 is coupled to receive operands values from stack processor 202 while stack processor 202 is processing instructions. Initially, one or more stack instructions will push values on the stack. Subsequent instructions will pop one or more instructions from the stack, operate on the instructions in accordance with the instruction opcode, and then push some resulting values back on the stack. Consequently, many of the instructions do not explicitly include operand values or addresses within the instructions. Instead, operand values and addresses are supplied by popping the values off the stack. Those skilled in the art will understand that the values contained in the stack are referenced implicitly by the type of operation and the location in the stack. By storing many of the operand values on the stack rather than in the actual instructions, applications are smaller and require considerably less memory during processing.

To improve overall performance, one embodiment of stack decoder 226 is also capable of performing aggressive instruction folding techniques to reduce the number of instructions sent to stack processor 202. Instruction folding determines which intermediate stack instructions are unnecessary and replaces them with fewer instructions capable of generating functionally equivalent results. For example, assume an excerpt of code includes the following two instructions: 1: MEMORY[145]→STACK; 2: STACK→REGISTER[14]. Essentially, the first instruction moves data stored at memory address 145 onto the top of stack and the second instruction moves top of stack entry into register number 14. One stack folding technique in stack decoder 226 could reduce this pair of instructions to: 1: MEMORY[145]→REGISTER[14] and move the data stored at memory address 145 directly into register number 14, thus saving several instruction cycles in execution. For more information on instruction folding see U.S. patent application Ser. No. 08786,351, filed Jan. 23, 1997, entitled, "Instruction Folding for Stack Based Machines", authored by James Michael O'Connor and Marc Tremblay, herein incorporated by reference in the entirety.

In contrast to regular stack instruction 302, extended stack instructions 304–310, illustrated in FIG. 3, execute on stack based processor 202 (FIG. 2) and control copy unit 206 and register processor 204. Extended stack instructions 304–310 (FIG. 3) can cause copy-unit 206 (FIG. 2) and register processor 204 to operate. In such an instruction, copy-unit decoder 228 decodes the copy unit portion of an extended instruction and generates control signals to operate copy unit 206. Similarly, register processor decoder 230 decodes the register processor portion of an extended instruction and then generates control signals to operate register processor 204.

Referring to FIG. 2, copy-unit decoder 228 sends control signals to copy-unit 206 which causes data to be transferred between the storage devices coupled to stack processor 202 and the storage devices coupled to register processor 204. In response to receiving an extended stack instruction, copy-unit decoder 228 generates control signals which drive copy-unit control lines 232 coupled to copy-unit 206. In response to these signals, copy-unit 206 copies data between a stack entry in stack 210 and register file 208 or directly from memory to register file 208 using DMA (direct memory access) controller 236. To facilitate the data transfer, copy-unit 206 is coupled to stack 210, data cache 212, and register file 208 with corresponding bi-directional data ports as illustrated in FIG. 2. Further, typical information carried over copy-unit control lines 232 include register addresses, stack addresses, data cache address values, and timing information to ensure that data is properly transferred between the various storage areas coupled to copy-unit 206.

Register processor decode unit 230 drives register control lines 234 which are operatively coupled to register processor 204. Logic within register processor decoder 230 processes an extended stack instruction received from instruction preprocessor logic 227 and transmits control signals over register control lines 234 to register processor 204. Information from an extended stack instruction transmitted over register control lines 234 include source registers, destination registers, and memory addresses associated with register processor 204 and register file 208. Essentially, control signals transmitted by register processor decoder 230 directly controls operation of register processor 204.

Values and operands are provided to register processor 204 using copy unit 206. Copy unit 206 is important because it enables register processor 204 to use values stored in stack 210 without using a significant number of transfer lines between stack processor and 202 and register processor 204.

In response to control signals transmitted over register control lines 234, register processor 204 operates on the operands and values stored in register file 208 by copy unit 206. Register processor 204 is a multimedia functional unit assisting stack processor 202 in processing graphical, audio, and video type processing operations.

Accordingly, there are several novel instructions useful in operating embodiments of the present invention. Referring back to FIG. 3, a register-stack copy stack instruction 304 includes an EXT BYTE entry for flagging the instruction as an extended stack instruction, a COPY OPCODE entry to indicate the instruction is used for copying operands between the stack and a register, a REGISTER entry to indicate the register which is to receive the first stack entry, and a COUNT entry to indicate the number of additional sequential registers which are to receive values off the stack. Thus, instruction 304 can be used to pop multiple operands off the top of stack and copy them over to multiple corresponding registers or copy the values in multiple registers back onto the stack. As an example, a first pseudo-code 304a represents the functional operation of register-stack copy stack instruction 304 as used to copy values from the top of stack to a register and vice-versa.

A second embodiment includes a register-register stack instruction 306 which includes an EXT BYTE entry for flagging the instruction as an extended stack instruction, a REGISTER OPCODE entry, a REGISTER SOURCE 1 entry, a REGISTER SOURCE 2 entry, and a REGISTER DESTINATION entry. The REGISTER OPCODE entry in register-register stack instruction 306 is decoded by register processor decoder 230 (FIG. 2) which causes register processor 204 to perform the corresponding REGISTER OPCODE function on the corresponding register entries in register file 208. For example, REGISTER OPCODE could indicate that the values stored in REGISTER SOURCE 1 and REGISTER SOURCE 2 registers in register file 208 should be sent through a arithmetic-logic unit to be summed and stored in REGISTER DESTINATION register file 208. As an example, a second pseudo-code 306a (FIG. 3) represents the functional operation of a register-register stack instruction 306 used to operate on two registers and store the results in a third register.

In yet another embodiment, an extended stack instruction can be used to move data values directly between memory and registers in register file 208 (FIG. 2) using direct memory access (DMA) techniques. Referring back to FIG. 3, DMA stack instruction 308 includes an EXT BYTE entry for flagging the instruction as an extended stack instruction, a REGISTER OPCODE entry, a SOURCE 1 entry, a COUNT entry, and a REGISTER DESTINATION entry. In instruction 308, the REGISTER OPCODE entry in DMA stack instruction 308 is decoded by copy-unit decoder 228 (FIG. 2) which causes copy-unit 206 to access memory directly through DMA controller 236. Copy unit 206 then copies a number of values in memory, as indicated by the COUNT entry, directly to entries in register file 208. As an example, a third pseudo-code 308a (FIG. 3) represents the functional operation of a DMA stack instruction 308 used to copy memory values to a register and vice versa.

Figure 6:
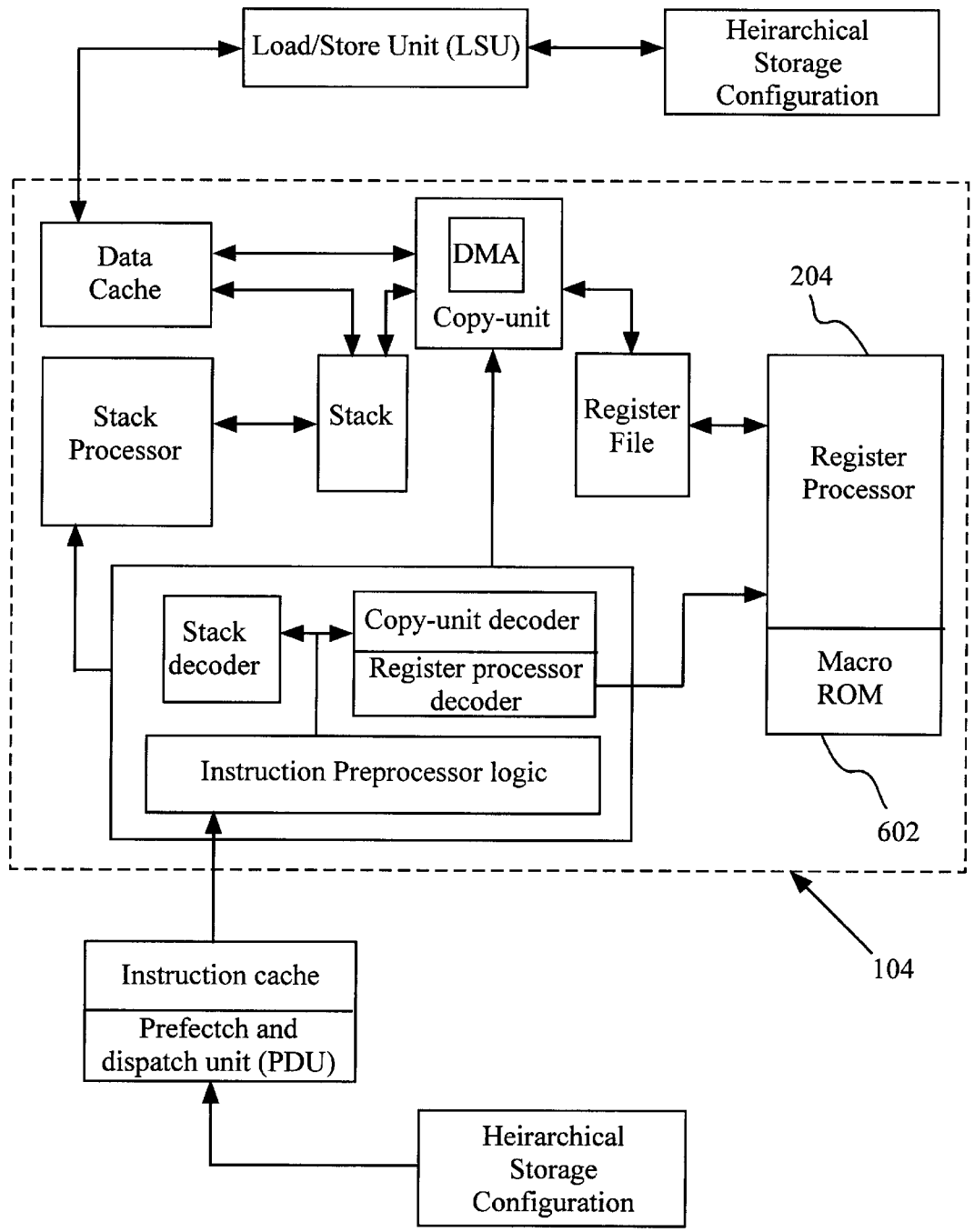
FIG. 6 is a block diagram illustrating an alternative embodiment of the present invention which includes a macro ROM, in addition to the elements illustrated in FIG. 2, for storing macros.

Another embodiment of the present invention utilizes a macro stack instruction 310 to process more complex operations on register processor 204 (FIG. 2). Macros save processing cycles because many instructions can be executed on register processor 204 by specifying one or more macro instructions. FIG. 6 is a block diagram illustrating an alternative embodiment of the present invention, compatible with instruction 310 (FIG. 3), which includes a macro ROM 602 in addition to the elements discussed above and illustrated in FIG. 2. Essentially, macro ROM 602 includes groups of frequently used instructions for performing multimedia operations such as MPEG coding, digital Dolby/AC-3 coding, or image processing. Each group of macro instructions is referenced by a macro label. Thus, a macro stack instruction 310 (FIG. 3) need only reference the desired macro instructions to execute the corresponding group of instructions. Referring back to FIG. 3, macro stack instruction 310 includes an EXT BYTE entry for flagging the instruction as an extended stack instruction, a REGISTER OPCODE entry, and a REGISTER entry for specifying any parameters which may be needed. When the REGISTER OPCODE specifies a macro label stored in macro ROM 602 (FIG. 6), a series of instructions associated with the particular macro label are executed by register processor 204 (FIG. 2). These instructions can perform a wide range of frequently executed multimedia procedures, such as MPEG and Digital Dolby/AC-3 as discussed above, in addition to typical mathematical operations such as divide. As an example, a fourth pseudo-code 310a (FIG. 3) represents the functional operation of a macro stack instruction 310 as used to execute a series of instructions for an MPEG macro.

Copy Unit

Figure 4:
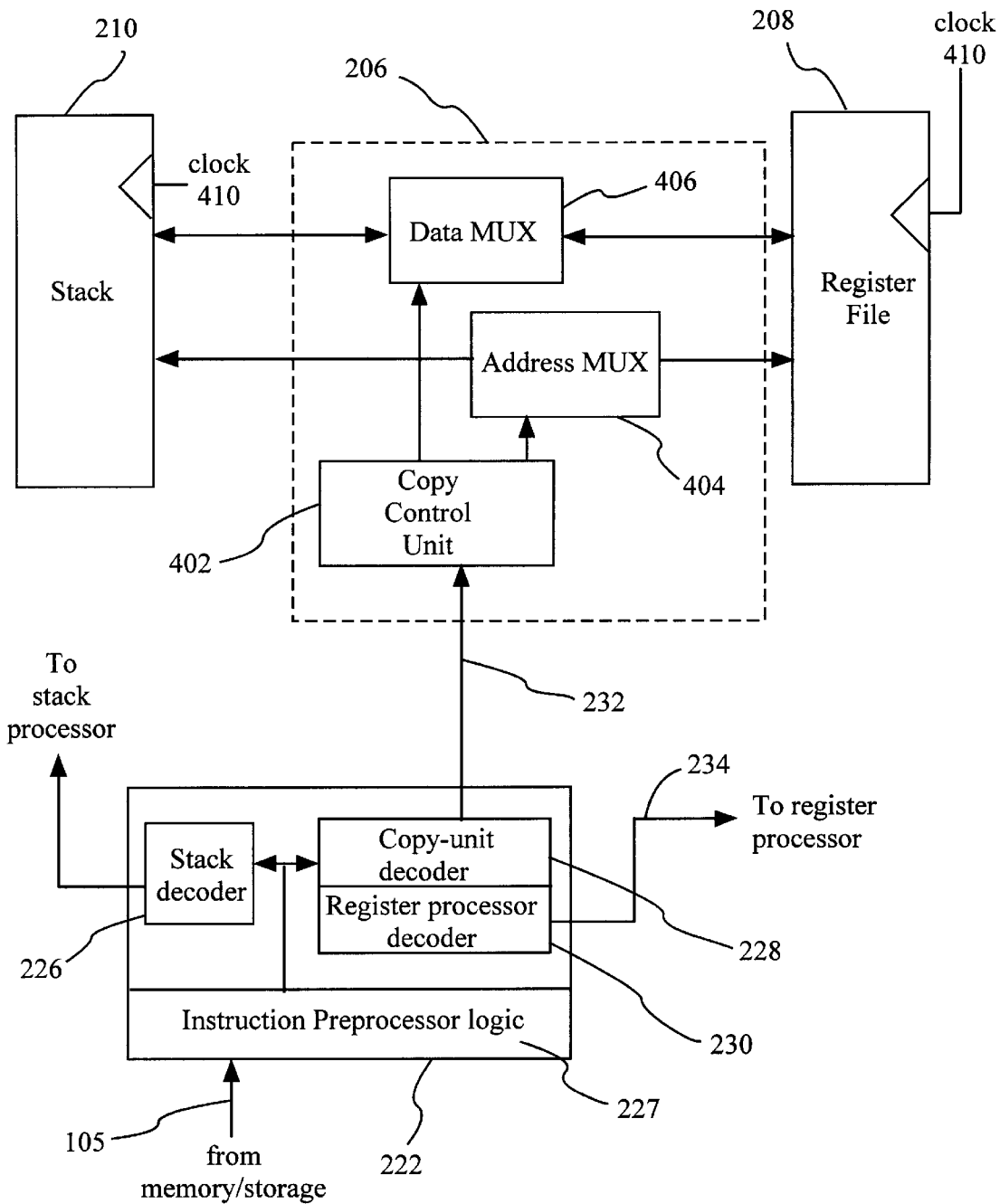
FIG. 4 is a block diagram illustrating one embodiment of a copy-unit designed in accordance with principles of the present invention.

Referring to FIG. 4, a block diagram illustrates one embodiment of copy unit 206 (FIG. 2), stack 210, register file 208, and instruction decoder 222, designed in accordance with principles of the present invention. Copy-unit 206 includes a copy control unit 402 operatively coupled to an address MUX 404 and a data MUX 406. One function of copy-unit 206 is to transfer operands and data values between stack 210 and register file 208.

Copy control unit 402 is coupled to receive control signals and data addresses over copy-unit control lines 232 as illustrated in FIG. 4. As previously discussed above, copy-unit decoder 228 generates control signals and data addresses in response to receiving extended stack instructions. Data addresses provided to copy control unit 402 includes the address, or addresses, of data in stack 210 or register file 208.

Address MUX 404 loads data addresses into register file 208, stack 210, or other storage devices (not shown) in preparation for the exchange of data values. Loading data address information prepares copy unit 206 for the transfer of data through data MUX 406. Accordingly, address MUX 404 is coupled to receive data entry addresses from copy control unit 402 as illustrated in FIG. 4. These data entry addresses can directly or indirectly reference a source address and a destination address appropriate for the type of storage device involved. For example, the source address for stack 210 can be a top of stack indicator while the destination address for register file 208 can be a specific register. Copy control unit 402 also provides address MUX 404 with control signals, such as clocking 410, to ensure proper settling time in the circuitry before exchanging data.

Referring to FIG. 4, data MUX 406 is also coupled to receive control information from copy control unit 402 and facilitates the exchange of data between stack 210 and the register file 208. In one embodiment, data MUX 406 is capable of performing routine data manipulations such as byte-ordering (e.g. Big Endian, Little Endian) and byte alignments when necessary. Further, data MUX 406 is capable of exchanging different units of data depending on which type of transfer is more efficient under the circumstances. For example, data MUX 406 can exchange data using blocks of words, address ranges of words, multiple words, and other data sizes such as bytes.

Data exchanged through data MUX 406 is coordinated with the operation of stack processor 210 (FIG. 2) to operate stack and register processor 104 (FIG. 1) most efficiently. In one embodiment, one edge of a clock signal can be used to initiate transfer of data between stack 210 and register file 208 while another edge of the clock signal can be used to trigger processing on the register processor 204 (FIG. 2). Timing the exchange of data through data MUX 406 in FIG. 4 to overlap with processing on register processor 204 (FIG. 2) can improve the already beneficial co-processing arrangement between stack processor 202 and register processor 204. For example, the rising edge of a clock signal can be used to initiate the exchange of data from stack 210 to register file 208 while the falling edge of the clock signal can be used to initiate actual processing of the data on register processor 204 (FIG. 2).

In operation, a computer application executed on stack and register processor 104 (FIG. 1) is able to process a stream of stack instructions as well as provide the functions needed by multimedia type applications. Initially, assume stack and register processor 104 (FIG. 1) includes a register based processor coupled to a register file which is capable of processing operands stored in the register file. Also, assume stack and register processor 104 (FIG. 1) includes a stack based processor coupled to the register based processor using one embodiment of the present invention.

Figure 5:
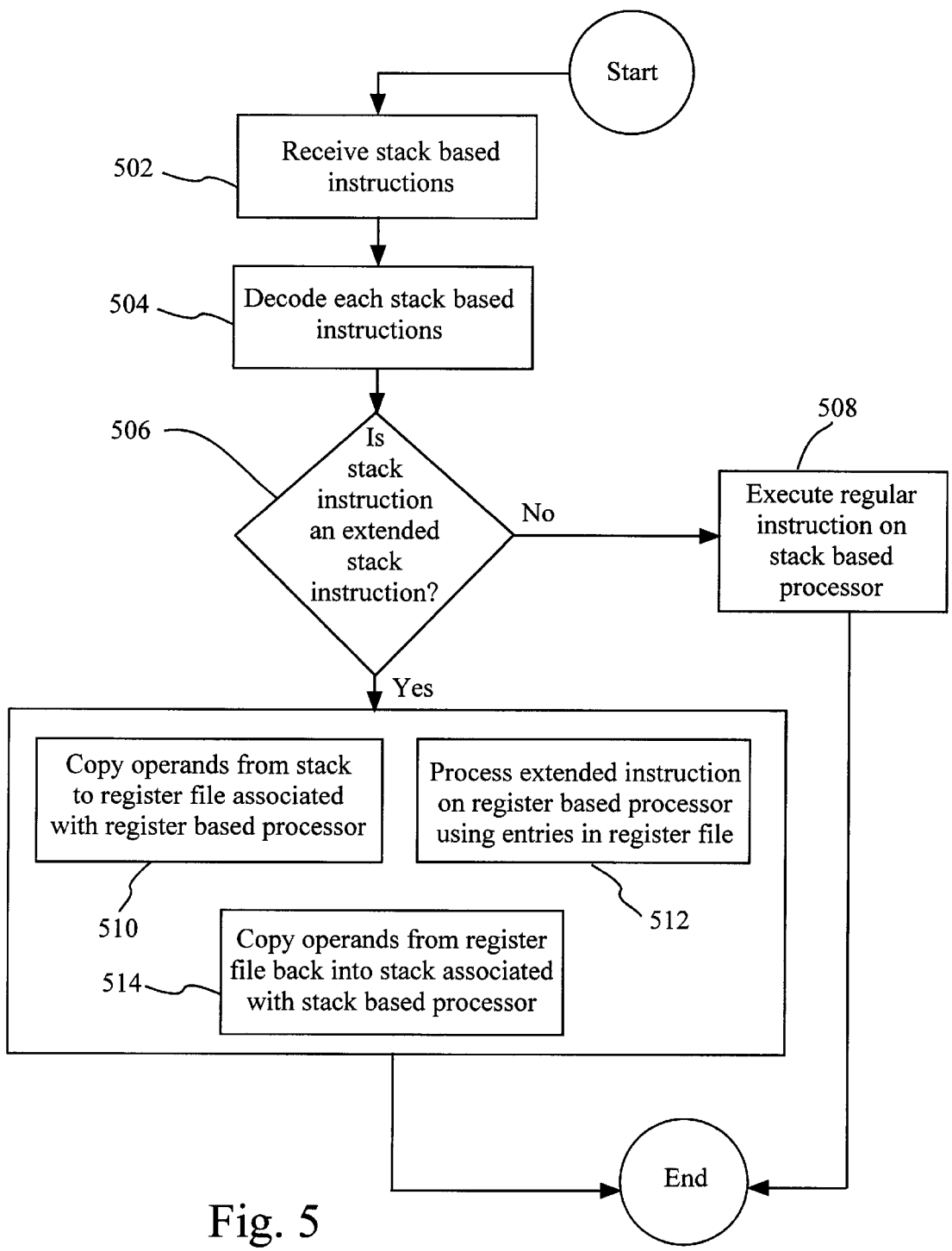
FIG. 5 is flowchart providing the overall steps for processing stack instructions using one embodiment of the present invention.

Referring to FIG. 5, a flowchart provides the overall steps for processing stack instructions on stack and register processor 104 (FIG. 1) discussed above. Initially, one or more stack based instructions are provided to the stack based processor at step 502 (FIG. 5). Next, at step 504 the stack based instructions are decoded. Determination step 506 determines which of the stack based instructions are regular stack instructions and which are extended stack instructions. As discussed above, the regular stack instructions are instructions that do not relate to multimedia operations and the extended stack instructions are instructions that do relate to multimedia operations. If a decoded instruction is a regular stack instruction, processing transfers from step 506 to step 508 wherein the regular instruction is executed on the stack based processor using conventional methods. However, if the decoded instruction is an extended instruction several additional steps must be performed. Depending on the actual instruction stream, one or more of the following steps can be performed either sequentially or in a substantially parallel manner. Accordingly, step 510 copies operands from the stack associated with the stack based processor to the register file associated with the register based processor. Step 512, processes the extended instructions using data entries copied into the register file during step 510. At step 514, results in the register file are copied back into the stack where they are available for further processing or use in a peripheral device such as a display device.

Embodiments of the present invention provide a novel architecture with several advantages. First, applications executed on a combination stack and register processor can perform high performance graphics operations using very compact and dense code. Stack based instructions can be used to operate both the stack processor as well as the register based processor. This keeps the width of the instructions narrow and the overall size of the application small. Thus, compact applications can process regular stack instructions on the stack based processor while taking advantage of graphics or real-time processing available on the register based processor.

Despite this novel architecture, embodiments of the present invention remain compatible with other convention stack based processor. Combining the stack based processor with a separate register based processor improves multimedia performance while maintaining downward compatibility with conventional stack based processors. For example, assume a first cellular phone has a sophisticated display and uses a stack processor coupled to a register processor using one embodiment of the present invention. Video and graphics displayed on this sophisticated display are driven by the register based processor while other types of general processing is performed on the stack based processor. Next, assume a second cellular phone has a conventional display which is not capable of displaying multimedia type graphics or video and therefore only uses a conventional stack based processor for all processing requirements. Further, assume a software application is executed on both the first and second phone which includes regular stack instructions, executable on the stack based processor, and extended stack instructions executable with assistance from a register based processor coupled to the stack based processor in accordance with the present invention. Nonetheless, both the first and second cellular phone can share the same stack based applications since both phones include a compatible stack based processor. Specifically, to handle an extended stack instruction, the second phone executes a trap mechanism which treats the extended instructions as a no-op (no operation) instruction and then advances the program counter for the software application accordingly.

Coupling a register based processor to a stack based processor in accordance with the present invention also provides for an easier upgrade path for high performance processors. For example, a computer manufacturer can increase the performance of the register processor and attach it to the stack processor without redesigning the stack processor as well. Using the present invention, the computer manufacturer can upgrade the register processor and couple it to the original stack processor at a reduced research and development cost.

While specific embodiments have been described herein for purposes of illustration, various modifications may be made without departing from the spirit and scope of the invention. Those skilled in the art understand that the present invention can be implemented using a variety of different stack based processors and register based processors coupled together using a copy unit designed in accordance with teachings of the present invention. Alternative embodiments substantially similar to the embodiments discussed could be implemented except that the copy unit can be used to exchange flags, semaphores, addresses and other messages between the stack processor and the register based processor.

Accordingly, the invention is not limited to the above described embodiments, but instead is defined by the appended claims in light of their full scope of equivalents.

What is claimed is:

1. A microprocessor capable of executing stack instructions and performing multimedia and non-multimedia operations comprising:

a stack processor configured to perform non-multimedia operations, said stack processor operatively coupled to a stack capable of storing values;

a register processor configured to perform multimedia operations, said register processor operatively coupled to a register file capable of storing values; and a copy unit having a first port operatively coupled to the stack and a second port operatively coupled to the register file being configured to copy data between the register file and the stack.

2. The microprocessor in claim 1 further comprising:
a macro storage element operatively coupled to the register processor for storing one or more groups of instructions executable on the register processor.

3. The microprocessor in claim 1 further comprising:
logic, operatively coupled to receive the plurality of stack based instructions and configured to determine which of the plurality of stack based instructions are regular stack instructions that do not relate to multimedia operations and which of the plurality of stack based instructions are extended stack instructions that do relate to multimedia operations;
a stack decoder having a first port operatively coupled to the logic and a second port operatively coupled to the stack processor, configured to decode regular stack instructions and provide control signals to the stack processor;
a copy-unit decoder having a first port operatively coupled to the logic and a second port operatively coupled to the copy-unit, configured to decode extended stack instructions and provide control signals to the copy-unit; and
a register processor decoder having a first port operatively coupled to the logic and a second port operatively coupled to the register processor, configured to provide control signals to the register processor.

4. The microprocessor of claim 3 wherein the copy unit further comprises:
a copy control unit having a first input port operatively coupled to the copy-unit decoder configured to receive control signals and addresses used in operation of the copy-unit;
a data MUX having a first port operatively coupled to the copy control unit, a second port operatively coupled to the stack, and a third port operatively coupled to the register file and configured to exchange values between the stack and the register file; and
an address MUX having a first port operatively coupled to the copy control unit, a second port operatively coupled to the stack, and a third port operatively coupled to the register file and configured to route the appropriate addresses to the appropriate register file or stack.

5. The microprocessor of claim 4 wherein the copy unit further comprises:
a direct memory access controller (DMA) operatively coupled to the copy unit, configured to control the exchange of values between the register file and a memory operatively coupled to the copy unit.

6. A method executed on a computer for processing multimedia and non-multimedia operations provided a plurality of stack based instructions, the method comprising the steps of:
providing a register based processor operatively coupled to a register file and capable of processing operands stored in a register file;
providing a stack based processor operatively coupled to a stack;
determining which of the plurality of stack based instructions are regular stack instructions and which are extended stack instructions, wherein the regular stack instructions are not related to multimedia operations and the extended stack instructions are related to multimedia operations; and
executing the regular stack instructions on the stack based processor, if decoded instruction is a regular stack instruction.

7. The method of claim 6 further comprising the following steps when the stack based instruction is an extended instruction:
copying one or more values from the stack to one or more corresponding register entries in the register file;
processing the extended stack instruction on the register based processor using the one or more values stored in the one or more corresponding entries in the register file and generating results;
storing the results generated by the register based processor into one or more entries in the register file; and
copying the one or more values from the one or more entries in the register file to one or more corresponding entries in the stack.

8. The method of claim 6 further comprising the following steps when the stack based instruction is an extended instruction:
providing one or more source register addresses, corresponding to one or more source registers, and one or more destination register addresses, corresponding to one or more destination registers, to the register based processor for performing a register-register stack instruction;
operating an arithmetic-logic unit in the register based processor to perform an operation on the values contained within one or more source registers, the operation selected from an arithmetic operation and a logical operation; and
storing a result from the operation performed on the values contained within one or more source registers into the one or more destination registers.

9. The method of claim 6 further comprising the following steps when the stack based instruction is an extended instruction:
providing one or more memory addresses, corresponding to one or more memory storage units, and one or more destination register addresses, corresponding to one or more destination registers, to the register based processor for performing a direct-memory access (DMA) stack instruction; and
operating a DMA controller to transfer the values stored in the one or more memory storage units to the one or more destination register addresses.

10. The method of claim 6 further comprising the following steps when the stack based instruction is an extended instruction:
providing a macro storage element for storing one or more groups of register instructions executable on the register processor, each group of register instructions having a macro label;
providing a macro stack instruction to the register based processor, the macro stack instruction associated with a macro instruction label;
comparing the macro instruction label associated with each of the macro labels associated with each of the groups of register instructions stored in the macro storage element; and
when the comparison indicates a match between a macro label and a macro instruction label, executing the group of register instructions in the macro storage element on the register processor corresponding to matching macro label.

* * * * *

UNITED STATES PATENT AND TRADEMARK OFFICE
CERTIFICATE OF CORRECTION

PATENT NO. : 6,088,786
DATED : July 11, 2000
INVENTOR(S): Gary Feierbach, Belmont; Mukesh Patel, Fremont, both of California It is certified that error appears in the above-identified patent and that said Letters Patent is hereby corrected as shown below.

Title: "METHOD AND SYSTEM FOR COUPLING A STACK BASED PROCESSOR TO <u>A</u> REGISTER BASED FUNCTION UNIT"

Column 1, Lines 7 and 8
    This application is related to U.S. Application Serial No.
    [8/x filed xx, 1997] <u>08/884,256 filed November 14, 1997</u>

Column 1, Line 11…application serial no. [8/x filed xx] <u>08/884,257 filed June 27, 1997</u> entitled "[A] Processor complex for executing mutimedia functions"

Column 6, Lines 17, 18
    …application serial no. [08/xxx,xxx] <u>08/788,807</u>, filed January 23, 1997

Signed and Sealed this

Twenty-second Day of May, 2001

Attest:

NICHOLAS P. GODICI

*Attesting Officer*     *Acting Director of the United States Patent and Trademark Office*